United States Patent [19]

Mims et al.

[11] 3,722,917

[45] Mar. 27, 1973

[54] TRAILER HITCH APPARATUS

[76] Inventors: Paris A. Mims; Larry Ronnie Nettles, both of 5931 Britmore Rd., Houston, Tex. 77040

[22] Filed: June 28, 1971

[21] Appl. No.: 157,497

[52] U.S. Cl. ................................280/423 R, 280/495

[51] Int. Cl. ................................B62d 53/00

[58] Field of Search ................................280/423 R, 495

[56] References Cited

UNITED STATES PATENTS

| 3,390,896 | 7/1968 | Philapy | 280/423 R |
|---|---|---|---|
| 3,392,992 | 7/1968 | Baker | 280/423 R |
| 3,383,119 | 5/1968 | Carroll | 280/423 R X |

FOREIGN PATENTS OR APPLICATIONS

| 562,246 | 11/1957 | Belgium | 280/423 R |
|---|---|---|---|

*Primary Examiner*—Leo Friaglia
*Attorney*—Carl B. Fox, Jr.

[57] ABSTRACT

Trailer hitch apparatus wherein a support beam is mounted over the rearward portion of a vehicle, e.g. an automobile, and the trailer, extending over the rearward part of the vehicle, is connected by a trailer hitch to the support beam. Each end of the support beam is provided with a hinged yoke, the ends of each yoke each being removably connected to a fitting installed on the vehicle, and the fittings being preferably disposed forward and rearward of each rear wheel of the vehicle.

5 Claims, 6 Drawing Figures

Paris A. Mims
Larry Ronnie Nettles
INVENTORS

BY Carl B. Fox, Jr.
ATTORNEY

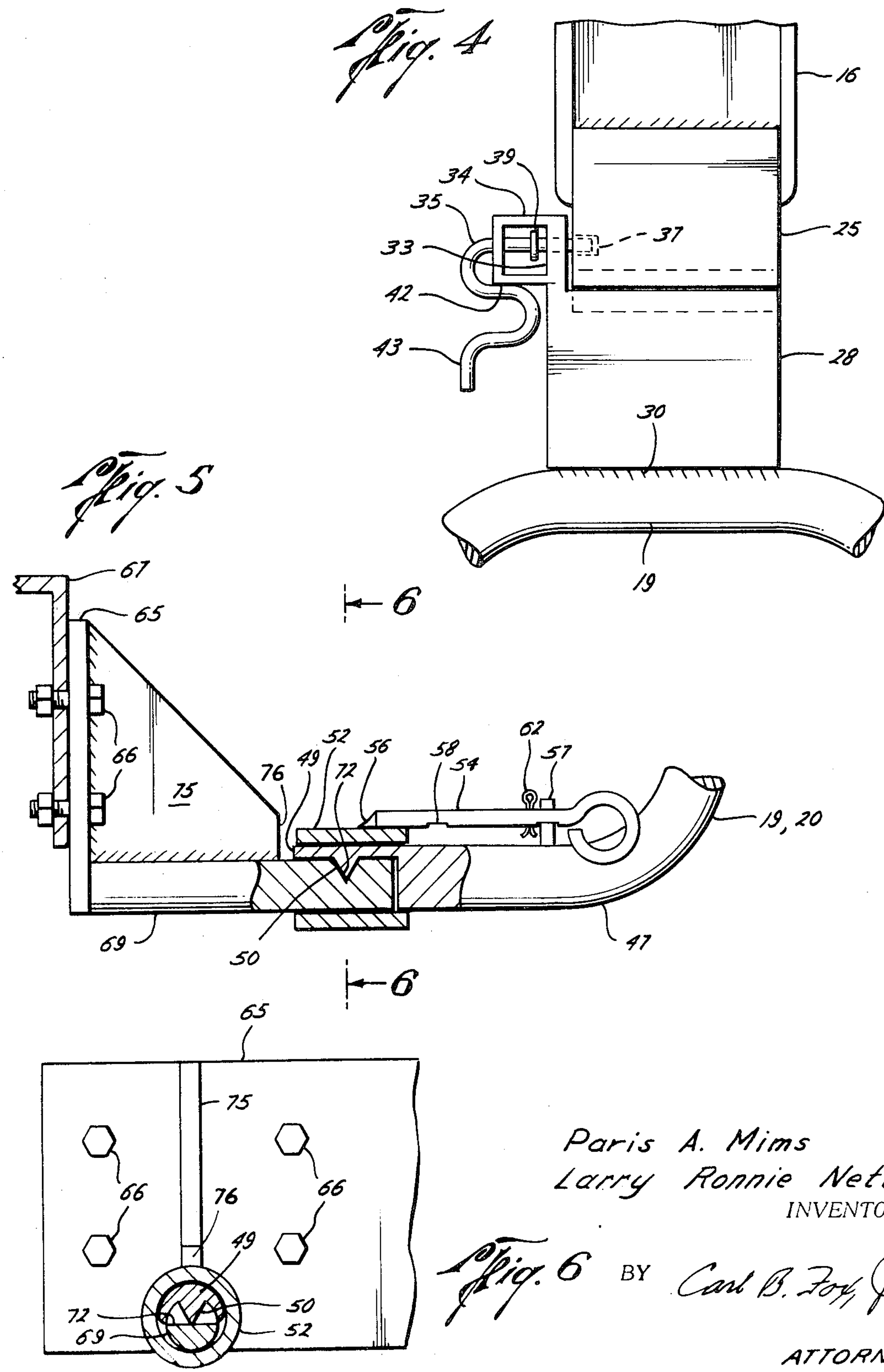
Paris A. Mims
Larry Ronnie Nettles
INVENTORS
BY Carl B. Fox, Jr.
ATTORNEY

TRAILER HITCH APPARATUS

SUMMARY OF THE INVENTION

Trailers to be towed by automotive vehicles are conventionally connected to the rear end of the vehicle by a trailer hitch mounted at the rear bumper of the vehicle. Trailers to be pulled by small trucks, such as pickup trucks, are often similarly towed, and in recent years hitches have been mounted within the bed of the pickup truck in order that the trailer load will be supported at a more forward position.

According to this invention, a trailer hitch is provided which is usable with both automobiles and small trucks, such as pickup trucks, the connections of the trailer hitch assembly being made to the sides of the frame of the vehicle forward and rearward of each of the rear wheels of the vehicle. A yoke is provided at each end of a support beam. Each arm of each yoke has at its end a connection fitting which is releasably connected with a connection fitting mounted on the frame of the vehicle, fittings being provided forwardly and rearwardly of each rear wheel of the vehicle. The support beam is horizontal above the rear portion of the vehicle and turns downwardly at each of its ends to hinged connections with the two yokes.

The ball portion of a trailer hitch is mounted above the center of the upper horizontal portion of the support beam. The trailers to be towed in using the novel trailer hitch assembly are designed to extend over the rear portion of the towing vehicle. The socket of a trailer hitch is mounted centrally at the forward end of the trailer which extends over the rearward end of the vehicle. The hitch socket is releasably connected with the ball portion of the hitch which is carried by the support beam. Thus the downwardly acting load of the forward portion of the trailer is carried by the towing vehicle immediately over the rear wheels of the vehicle so that there is no downward thrust behind the rear wheels of the vehicle which would tend to elevate the front end of the vehicle. This is a decided advantage since it enables the towing vehicle to substantially retain its normal steering and handling characteristics.

In addition, the forward positioning of the trailer hitch enables turning of the towing vehicle and trailer in a much smaller turning radius, so that it is far easier to control and maneuver the vehicle and trailer. The trailer is of full height rearwardly of the towing vehicle, and the portion of the trailer which extends over the rear portion of the vehicle is relieved to provide an overhanging portion which extends forwardly to the hitch. This overhanding part of the trailer is useful for storage purposes, or for providing space for sleeping or other uses. The trailer may be made of longer overall length and greater capacity since the overhanging front part of the trailer can be added to a conventional trailer construction.

The trailer may be connected to the trailer hitch on the towing vehicle by backing the towing vehicle beneath the support beam to the proper position, the rear part of the vehicle passing to beneath the overhanging front portion of the trailer.

Other objects and advantages of the invention will appear from the following detailed description of a preferred embodiment, reference during the description being made to the accompanying drawings.

BRIEF DESCRIPTIONS OF THE DRAWINGS

FIG. 4 is an elevational view taken at line 4—4 of FIG. 3.

FIG. 5 is an enlarged partial view showing the connections between an end of a yoke arm and a support fitting mounted on the frame of a vehicle, the view being partially in vertical cross section.

FIG. 6 is a vertical cross sectional view taken at line 6—6 of FIG. 5.

DESCRIPTION OF THE PREFERRED EMBODIMENTS

Figure 1:
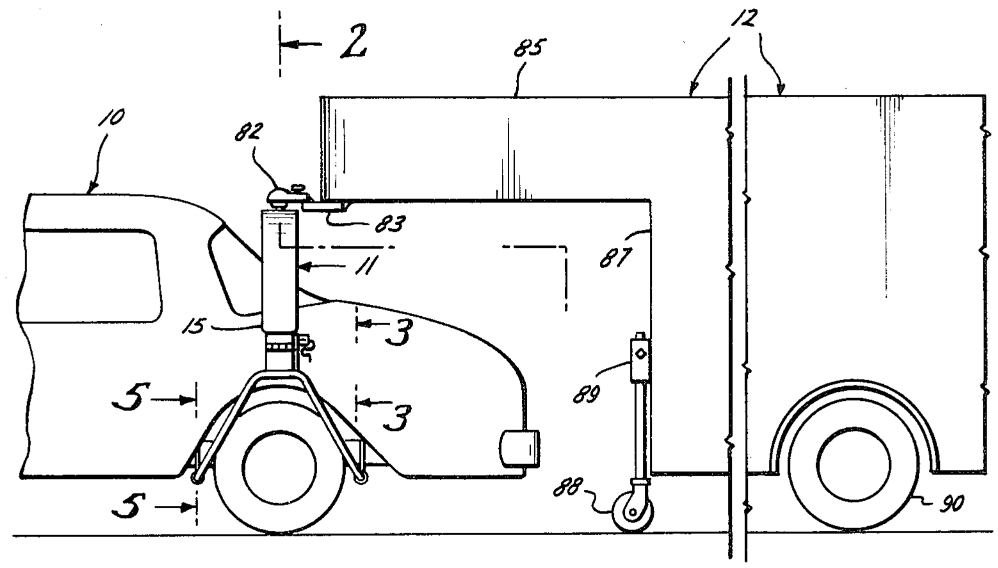
FIG. 1 is a side elevational view of a preferred embodiment of a trailer hitch according to the invention, showing the rear portion of a towing vehicle and forward and central portions of a trailer towed thereby.

Referring now to the drawings in detail, a towing vehicle, in this case an automobile 10, but which may be a different type of vehicle such as a pickup truck or any other vehicle of suitable form, has trailer hitch support assembly 11 mounted above the rear wheels of the vehicle. A trailer 12 is connected to the trailer hitch, to be towed by the towing vehicle. Support assembly 11 includes a support beam 15 which passes horizontally over the vehicle and is downturned at each of its ends at 16, 17, each end terminating downwardly adjacent a side of the vehicle. The lower portion of each end of the support assembly is formed by a hinged yoke 19, 20 connected by hinges 21, 22, respectively, to the ends of downturned beam portions 16, 17.

The ball connector 23 of a conventional trailer hitch is mounted at the center of the horizontal portion of support beam 15.

Figure 3:
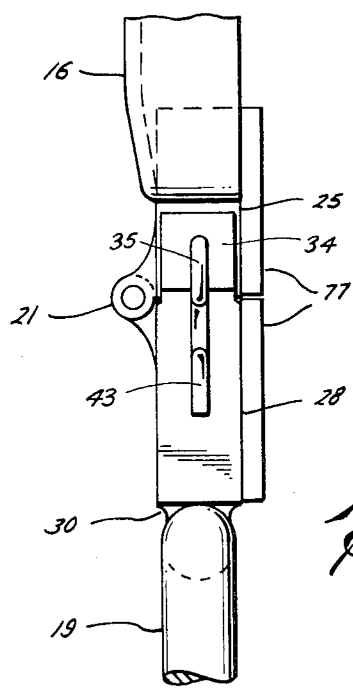
FIG. 3 is an enlarged partial side elevational view showing the hinged connection of a yoke to the support beam.

Referring now especially to FIGS. 3 and 4 of the drawings, the lower end of beam end 16 is shown having the upper end 25 of hinge 21 connected by welding thereto. Beam 15, and its ends 16, 17, are of channel form, the open side of the channel being downward and inward toward the vehicle. Lower flange 28 of hinge 21 is welded to yoke 19. The yoke may be formed of solid bar stock or of tubular material such as pipe, bent to the required shape. The weld between yoke 19 and hinge flange 28 is indicated by reference numeral 30.

Hinge flange 28 has an upwardly entending side extension 33 which extends to one side of hinge flange 25. A rectilinear bracket 34 is provided at the outer side of flange extension 33. A rod 35 is movably disposed through perforations through the outer side of bracket 34 and through flange extension 33, to be movable into and out of a hole 37 formed into the side of hinge flange 25. A washer 39 fixed around rod 35 within the bracket retains the rod against movement completely out of the bracket. Rod 35 is inturned to frictionally engage the lower side of the bracket at 42 and therebelow outturned to form a handle 43. Rod 35 may be moved into or out of hole 37 by grasping handle 43 and moving it to the desired location. Frictional engagement between the rod and bracket at 42 will retain the rod in engagement within opening 37. The load of a trailer connected to the support beam 15 will be borne by the closed hinge engagement between hinge flanges 25 and 28.

Figure 2:
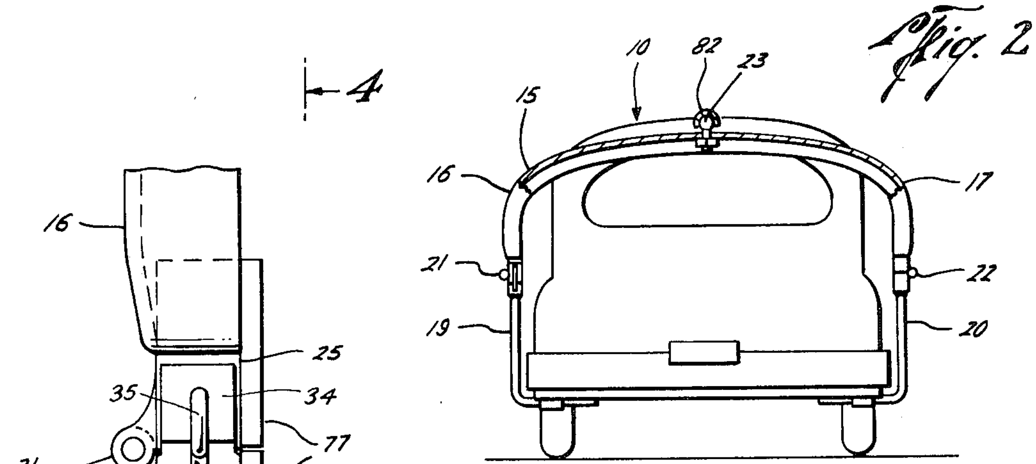
FIG. 2 is an elevational view, partly in vertical cross section, taken at line 2—2 of FIG. 1.

The shapes of the yokes 19, 20 are shown in FIGS. 1 and 2. The lower yoke ends, as has been stated, are bent to be directed toward the side of the vehicle frame and are connected to fittings carried by the vehicle frame.

Referring now to FIGS. 5 and 6 of the drawings, the lower inturned end 47 of a yoke 19 or 20, all of the yoke ends being constructed in the same manner, has at its end an extending half-tubular formation 49 which has a downwardly protruding lug 50 at its underside. A sliding sleeve 52 is disposed for sliding movement between an extended position over formation 49 and a retracted position away from formation 49. This movement of the sleeve is accomplished by movement, by hand, of a rod 54 welded or otherwise suitably connected to sleeve 52 at 56 and extending through a perforate bracket 57 welded or otherwise suitably connected to yoke end 47. Rod 54 has a notch at its underside which engages with a side of the perforation of bracket 57 to hold sleeve 52 in its retracted position, and has a hole to receive a cotter pin 62 therethrough which serves to hold the rod 54 in a position wherein sleeve 52 is extended and is positioned around formation 49.

A fish plate 65 is secured by bolts 66 to frame 67 of the towing vehicle. Plate 65 may be secured in other manner to the vehicle frame, as by welding or the like. A rod 69 is welded or otherwise suitably connected to plate 65 to extend generally horizontally outwardly therefrom. The rod 69 may be welded directly to the vehicle frame if desired. Rod 69 has across its upper side of a notch 72 adapted to receive lug 50 of formation 49. The fact that notch 72 is elongate across the upper side of rod 69 enables formation 50 to have some freedom of movement crosswise in the notch. Gusset plate 75 reinforces rod 69 and its vertical edge 76 serves as a stop of inner movement of sleeve 52.

To connect each yoke end to the vehicle, the sleeve 52 is retracted so that the half circle formation 49 may be rested over the end of rod 69 with lug 50 in notch 72. Then, the sleeve is moved inwardly toward fish plate 65 by manipulation by rod 54 and a cotter pin 62 is installed through the perforation of rod 54 so that the sleeve may not be retracted away from formation 49. To release the connection, the cotter pin is removed from the perforation and rod 54 is utilized to move sleeve 52 away from formation 49 so that formation 49 may be lifted off of the end of rod 69.

The rods 69, as best shown in FIG. 1, are mounted on the vehicle frame forwardly and rearwardly of each of the rear wheels of the vehicle. Thus, the rod fittings 69 are out of the way of rear wheel movement and are concealed by the fenders or body structure of the vehicle so as not to be unsightly when the trailer hitch assembly is disconnected and removed. When a yoke is disconnected from the two rod fittings 69 forwardly and rearwardly of a rear vehicle wheel, the yoke will move somewhat outwardly by pivotal movement around the hinge 21 or 22, and may be latched outwardly by re-movement of the rod 35 inwardly to a position inwardly against the upper hinge flange 25 of the respective hinge. This will prevent swinging to and fro of the yoke so that the vehicle may be driven to beneath the support beam 15, or driven from beneath it with safety and without danger of accidental collision with the yoke.

For additional protection of the vehicle, a resilient elastomeric pad 77, divided at the hinge, is bonded to the inner side of the hinge and to the lower end of the respective support beam end 16 or 17.

In review, the hitch assembly is connected to the vehicle by movement of the vehicle to beneath the inverted U-shaped support beam 15, the yoke end each being connected to the rod fittings 69 forwardly and rearwardly of each rear wheel. This is done with the support beam 15 hanging from the trailer at the hitch, composed of ball fitting 23 and socket fitting 82. Fitting 82 is mounted on a rod or bar 83 which is suitably connected to the forward end of overhanging portion 85 of trailer 12. The trailer has at vertical wall 87 a jack wheel 88 raisable and lowerable by jack 89. With the jack wheel 88 down against the ground to support the forward end of the trailer, forward of one or more trailer wheels 90, the support beam 15 is elevated off the ground, hanging from the trailer hitch. The vehicle is driven therebeneath and the yoke ends connected as described, after which jack wheel 88 may be raised off of the ground.

While a preferred embodiment of the invention has been described and shown in the drawings, many modifications thereof may be made by a person skilled in the art without departing from the spirit of the invention, and it is intended to protect by Letters Patent all forms of the invention falling within the scope of the following claims.

We claim:

1. Trailer hitch apparatus, comprising support assembly means adapted to be disposed crossways over a vehicle and having releasable connection means at its ends adapted for connection to opposite sides of the vehicle, said support assembly means comprising beam means having downturned ends adapted for disposition spaced from opposite sides of the vehicle and having downwardly facing yoke means hinged to the each said downturned end of said beam means, and trailer hitch means carried by said support assembly means intermediate of the length thereof.

2. The combination of claim 1, said hinged yoke means each comprising hinge means connected at one side to the lower end of one said downturned end of said beam means, the other side of said hinge means having bar means carried thereby which extends downwardly from opposite sides of said hinge means to form said yoke means, said bar means at the lower end of the yoke means being inturned toward said vehicle, fitting means adapted to be carried by the vehicle adjacent each inturned end of each said yoke, and connection means for releasably connecting said inturned ends of each yoke to a said fitting means.

3. The combination of claim 2, each said connection means comprising laterally projecting means on one of each said inturned end and fitting means and receptacle means for said laterally projecting means on the other of each said inturned end and fitting means, and slidable sleeve means for holding each said inturned end and fitting means together with said laterally projecting means received in said receptacle means.

4. Towing vehicle trailer hitch apparatus, comprising a towing vehicle, support assembly means adapted to be disposed crossways over said vehicle and having releasable connection means at its ends adapted for connection to opposite sides of said vehicle, trailer hitch means carried by said support assembly means intermediate of the length thereof, said support assembly means comprising beam means having downturned ends adapted for disposition spaced from opposite sides of said vehicle and having downwardly facing yoke means hinged to the each said downturned end of said beam means; said hinged yoke means each comprising hinge means connected at one side to the lower end of one said downturned end of said beam means, the other side of said hinge means having bar means carried thereby which extends downwardly from opposite sides of said hinge means to form said yoke means, said bar means at the lower ends of said yoke means being inturned toward said vehicle, fitting means carried by said vehicle adjacent each inturned end of each said yoke, and connection means for releasably connecting said inturned ends of each yoke to a said fitting means; each said connection means comprising laterally projecting means on one of each said inturned end and fitting means and receptacle means for said laterally projecting means on the other of each said inturned end and fitting means, and slidable sleeve means for holding each said inturned end and fitting means together with said laterally projecting means received in said receptacle means; said fitting means being carried by the frame of said vehicle forwardly and rearwardly of each rear wheel of said vehicle.

5. The combination of claim 4, including trailer means having at its front a forwardly projecting overhanging body portion adapted to reach to adjacent said beam means over the rearward part of said vehicle, trailer hitch means releasably connectable with said trailer hitch means on said support assembly means.

* * * * *